United States Patent [19]

Parsons, Jr.

[11] Patent Number: 4,887,417
[45] Date of Patent: Dec. 19, 1989

[54] BOOM MOWER ATTACHMENT FOR A TRACTOR ADJUSTABLE FOR CUTTING AT EITHER SIDE THEREOF

[76] Inventor: Ralph L. Parsons, Jr., 1795 Olmstead Rd., West Jefferson, Ohio

[21] Appl. No.: 156,816

[22] Filed: Feb. 17, 1988

[51] Int. Cl.⁴ .................. A01D 34/66; A01D 34/86
[52] U.S. Cl. ........................ 56/15.2; 56/10.4; 56/15.5; 56/235; 56/237
[58] Field of Search ............... 56/10.4, 10.7, 14.9, 56/15.2, 15.5, 15.9, 235, 237, 238, 234, 10.6; 172/98, 99, 439, 449

[56] References Cited

U.S. PATENT DOCUMENTS

| | | | |
|---|---|---|---|
| 2,624,999 | 1/1953 | Goodnight | 56/10.4 |
| 2,637,966 | 5/1953 | Richey | 56/10.4 |
| 3,032,956 | 5/1962 | Mullet | 56/15.2 |
| 3,087,296 | 4/1963 | Lowles | 56/10.7 |
| 4,302,922 | 12/1981 | Gwerndt et al. | 56/235 |

FOREIGN PATENT DOCUMENTS

| | | | |
|---|---|---|---|
| 2415230 | 10/1975 | Fed. Rep. of Germany | 56/14.9 |
| 244782 | 5/1969 | U.S.S.R. | 56/235 |
| 1584149 | 2/1981 | United Kingdom | 56/237 |

Primary Examiner—John Weiss
Attorney, Agent, or Firm—Sidney W. Millard

[57] ABSTRACT

A boom attachment which carries a work unit pivotally at its outer end and which is pivotally connected at its inner end to an upstanding support carried by a base is attached to the rear end of a tractor by a three-point hitch and is operated from a power take-off on the rear of the tractor. The boom is adjustable in a transverse plane at the rear of the tractor so that the work unit can be disposed at either side of the tractor without removing or replacing parts in making this adjustment. This adjustment is accomplished with a cylinder and piston unit which is connected at the side of the boom by outwardly extending pivots.

15 Claims, 5 Drawing Sheets

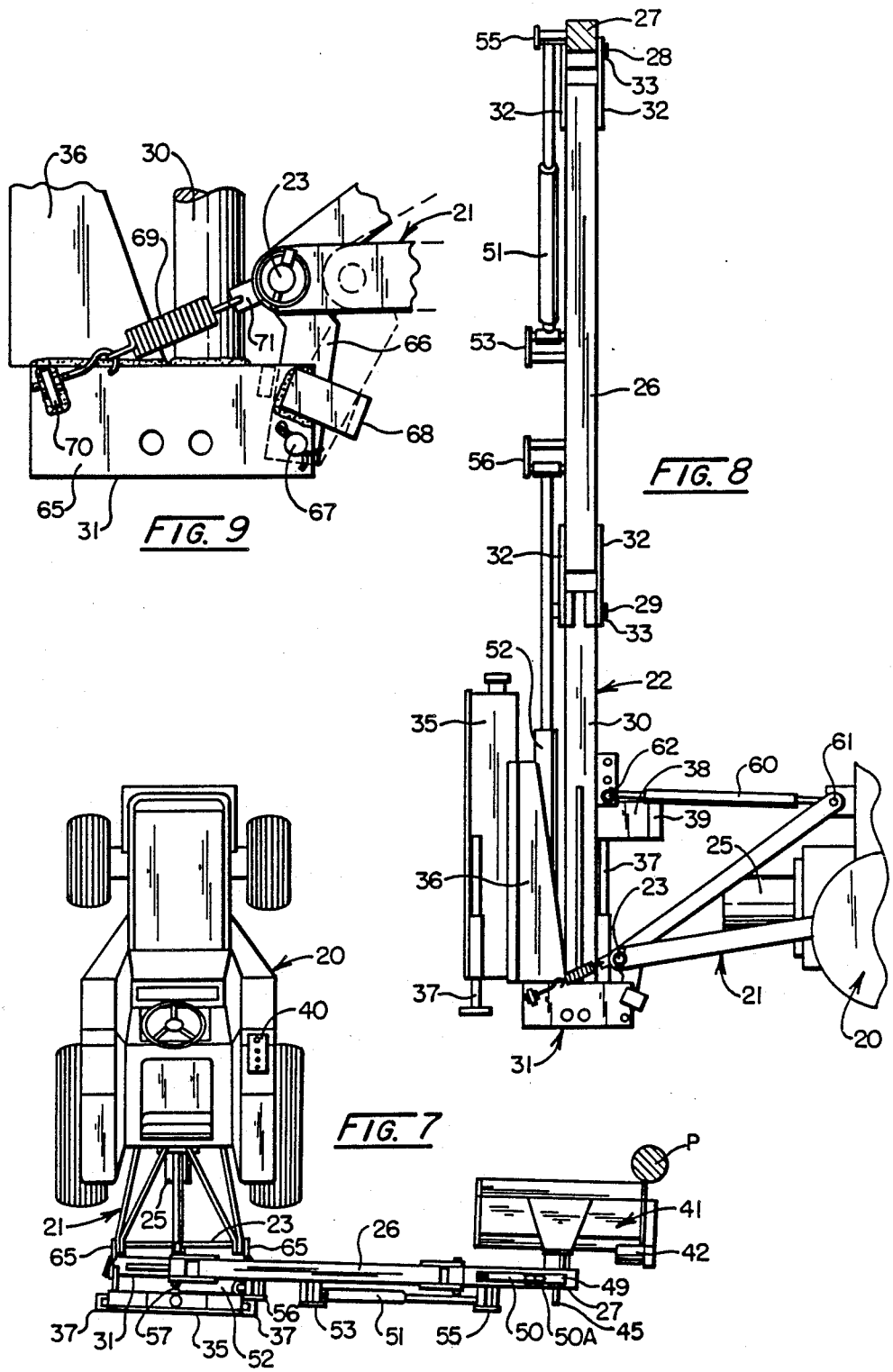

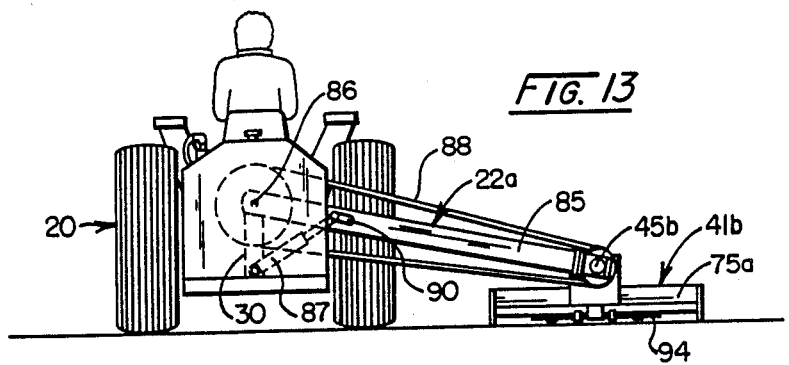
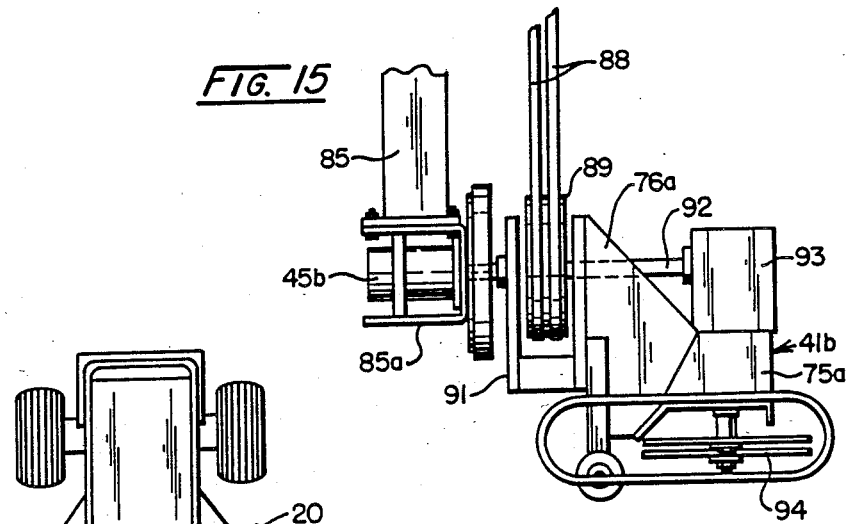
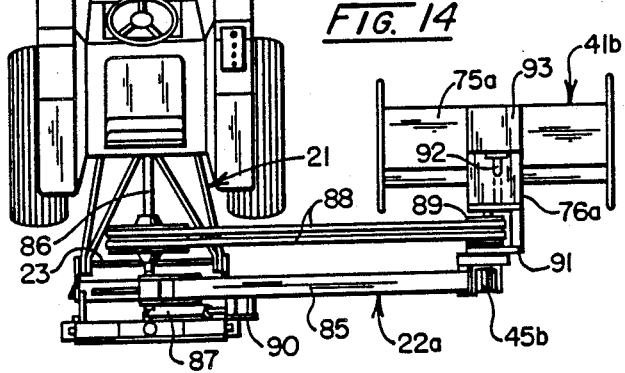

BOOM MOWER ATTACHMENT FOR A TRACTOR ADJUSTABLE FOR CUTTING AT EITHER SIDE THEREOF

FIELD OF INVENTION

This invention relates to an attachment having a boom which supports a work unit such as a mower or flail cutter or other types of work units. In the present description the work unit is referred to as a mower but it obviously can be other work units or tools supported on the outer end of the boom. The boom is mounted on the rear end of an ordinary tractor by means of the usual three-point hitch and power take-off connection.

PRIOR ART

Many types of attachments have been provided in the prior art consisting of a boom which is mounted on the rear end of a tractor by a three-point hitch and power take-off. These attachments usually consist of a boom pivotally connected to the tractor for swinging vertically. The outer end of the boom has a work unit such as a mower or flail cutter head pivoted thereto. The main disadvantage of these prior art attachments is that they can cut or work at one side only of the tractor. To change sides, if at all possible, it is necessary to remove the attachment from one side and remount it on the other side which is burdensome and time-consuming.

SUMMARY OF THE INVENTION

The present invention in its preferred form provides an articulated boom attachment consisting of at least two sections pivoted together with the innermost section pivotally mounted on the rear end of a tractor with a three-point hitch. The outer end of the outer section of the articulated boom carries a work unit such as a mower which is pivotally connected thereto. The pivoting of the articulated boom sections relatively and relative to the tractor is controlled by connected cylinders which are part of a hydraulic system powered from the power take-off of the tractor. The arrangement of the articulated boom and connected cylinders is such that the boom can swing through a vertical arc of about 210° to position the mower at either side of the tractor so that mowing can be at either side of the tractor without any disconnecting or remounting of parts.

In another form of the invention the attachment uses a single section boom which has the mower or other work unit pivoted to its outer end and driven by a belt and pulley arrangement extending along the boom. The inner end of the boom is pivoted at the usual tractor hitch for swinging movement through about 210° in a transverse plane at the rear of the tractor. This swinging movement is accomplished by a cylinder and piston unit as in the preferred form which is connected to the support and to the boom at outwardly extending pivots so as not to interfere with swinging movement of the boom. Since the drive and mounting will not interfere with this swinging movement the boom can swing to one side or the other for cutting or other work at either side of the tractor without removal and replacement of parts.

BRIEF DESCRIPTION OF THE DRAWINGS

The best mode contemplated in carrying out this invention is illustrated in the accompanying drawings in which:

FIG. 7 is a plan view of the tractor and attachment showing schematically how the safety breakaway joints at the tractor mount for the boom permit yielding if the mower strikes an obstruction;

FIG. 8 is an enlarged right-hand side elevational view showing the attachment in upright position on the tractor for transport;

FIG. 9 is an enlarged detail in side elevation showing one of the safety breakaway joints;

FIG. 13 is a rear elevational view showing a different form of the invention using a single section boom;

FIG. 14 is a plan view of the attachment of FIG. 13; and

FIG. 15 is a side elevational view showing the mower and the drive for the mower.

DETAILED DESCRIPTION OF THE INVENTION

Figure 1:
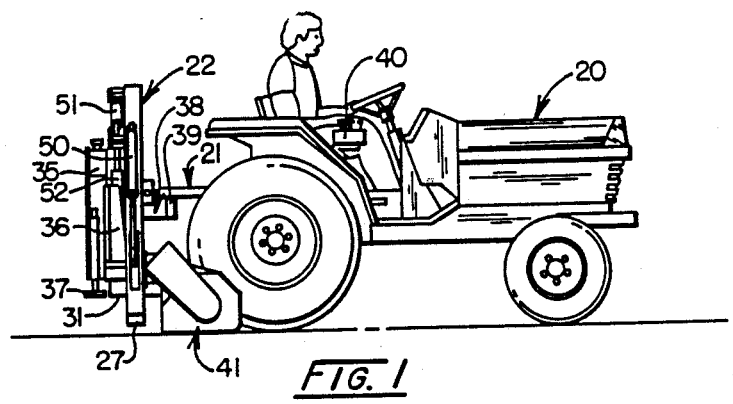
FIG. 1 is a side elevational view showing the preferred form of the attachment of this invention supported on the rear end of a tractor.

With reference to the drawings and specifically to FIGS. 1 to 5, 7 and 8 there is shown an example of a tractor 20 which is a standard type and has a three-point hitch arrangement of support arms 21 at its rear for suspending the attachment 22 of this invention for forward and rearward pivoting about a transverse horizontal axis at rod 23 (FIG. 7). The tractor has a hydraulic pump 25 which attached to the power take-off of the tractor 20 and is connected to the hydraulic system of the attachment by lines (not shown) in a conventional manner.

As previously indicated the preferred form of the attachment 22 is mainly in the form of an articulated boom consisting of at least two pivotally connected sections which are indicated in FIGS. 1 to 7 of the drawings as an inner section 26 and an outer section 27. The two sections are pivoted together for relative swinging in a transverse vertical plane by means of a pivot joint or pivot located at 28 between their adjacent ends. The inner end of the inner section 26 is pivoted by a similar pivot joint 29 to the upper end of an upright pedestal support 30 which extends upwardly from a support base 31. Each of the pivots 28 and 29 are similar consisting of a pair of pivot brackets 32 (FIG. 8) welded to one section which straddle the adjacent end of the other section and receive a transverse pivot pin 33. With this arrangement the sections 26 and 27 can swing relatively about the pivot 28 and the inner section 26 about the pivot 29 in a common vertical plane transversely of the tractor.

A suitable reservoir 35 for hydraulic fluid with baffels or fins 35a to aid in cooling of fluid is supported directly behind the pedestal support 30 by means of a pair of laterally-spaced upright brackets 36 which are supported in upstanding positions on the base 31. A pair of jacks or vertically adjustable supports 37 are attached to the reservoir at opposite vertical sides and are adapted to be used in hitching to and unhitching the attachment 22 from the tractor 20. The supports 37 may be adjustable to a level suitable for the attachment 22 to be easily connected to the tractor. After connecting the attachment to the tractor the supports 37 may be retracted vertically to avoid obstructions on the ground while the tractor is moving.

The reservoir is connected in the hydraulic system along with a hydraulic control box 38 mounted on the support 39 with an electric control unit 39 which is activated by a control panel 40 on the tractor.

Figure 6:
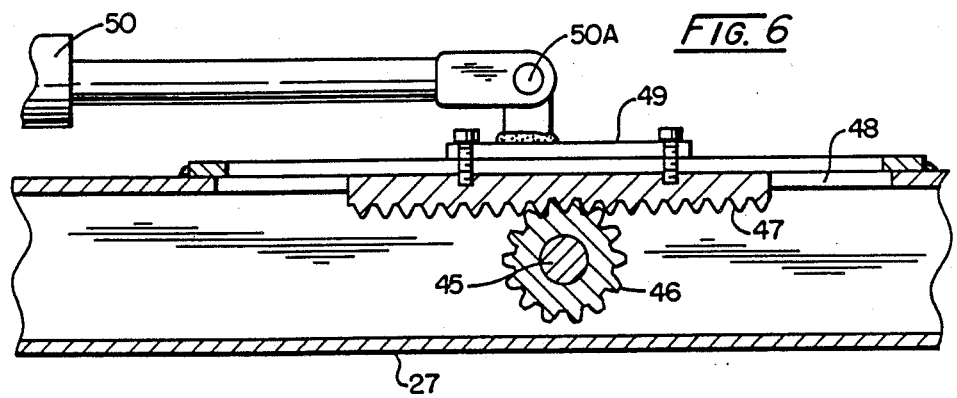
FIG. 6 is an enlarged sectional view taken through the mower or work unit support and showing means for adjusting the angle of the mower on its support.

The outer end of the outer section 27 of the articulated boom 22 carries a work unit 41 which may be a mower or flail cutter powered by a hydraulic motor 42. Preferably the motor is connected in the hydraulic circuit controlling the boom orientation. Other types of work units may be used. The work unit is pivotally mounted on the outer end of the boom section 27 for swinging through an angle of about 210°. This mounting is best illustrated in FIGS. 6 and 7 and includes a gear and pinion arrangement for positively adjusting the angle of the work unit relative to the boom end and holding it in adjusted position. Thus, the housing of the unit 41 has a shaft 45 rigidly carried thereby and extending rearwardly therefrom transversely through the hollow boom section 27 (FIG. 6). Within the section 27 this shaft has a pinion 46 keyed thereon which meshes with rack 47 reciprocably mounted in a slot 48 in the wall of section 27 by means of a slide 49. This slide 49 is connected pivotally to a hydraulic cylinder and piston unit 50 at 50A, the cylinder of which is fixed to the outer side of the boom section 27. Thus, actuation of the cylinder and piston unit 50 will move the rack 47 to rotate the pinion 46 and shaft 45 to adjust the work unit to the desired angle about the axis of the shaft 45.

The cylinder and piston unit 50 is connected in the hydraulic circuit with various other units including a cylinder and piston unit 51 for controlling relative swinging of boom sections 26 and 27 about the pivot 28 and a cylinder and piston unit 52 for controlling swinging of the inner boom section 26 about the support pivot 29. Each of the units 51 and 52 is similarly mounted at one side of the respective articulated boom sections 26 and 27 and support 30 rather than in the angles between those members to permit relative movement past center when desired without interference from the cylinder and piston units. These units are shown in a transverse plane at the rear of the boom parallel to that of the boom. Unit 51 as clearly seen at unit 26 has its cylinder pivoted to the boom section by a laterally outwardly or rearwardly extending pivot 53 (FIGS. 2 and 3) mounted in the boom section approximately midway of its ends and its piston rod pivoted by a similar pivot 55 to the adjacent boom section 27 adjacent its inner end. Cylinder and piston unit 52 is similarly connected to boom section 26 and support 30, the pivots being indicated at 56 and 57. Thus the sections 26 and 27 can be swung relatively about the pivot 28, and the section 26 can be swung about support pivot 29 by selective actuation of the side-mounted cylinders and piston units 51 and 52 without interference with these units even if the respective members are brought into alignment at a center position or beyond. Thus with this arrangement the articulated boom sections 26 and 27, with the work unit 41 properly positioned, can be moved relatively almost 180° in either direction and, the inner section 26 can be moved similarly relative to its support 30 in either direction, all in a common plane transversely at the rear of the tractor 20.

The attachment 22 may be in upright position at the rear of the tractor 20 as shown in FIG. 8 being held in that position by unit 60. This unit 60 has its front end pivoted at 61 to one of the tractor hitch points and its rear end pivoted at 62 to the front side of the support 30. Adjustment of the unit 60 will swing the entire attachment 22 about the axis of the rod 23 carried by the hitch 21. The vertical position shown in FIG. 8 is desirable for transportation. Stabilizers (unnumbered) extend between rod 23 and pin 61 to control height and strengthen the mounting on tractor 20.

It is desirable to have what is termed in the art as a breakaway connection between the hitch 21 and the base 31 of the attachment to permit rearwardly yielding of the attachment in case the mower 41 would strike a pole P or other obstruction as indicated in FIG. 7 during the mowing operation. This breakaway connection is indicated more in detail in FIGS. 8 and 9 and includes a pair of breakaway joints at the opposite sides of the base 31. This base 31 has rigidly attached to it at its opposite sides the vertical support brackets 65. Each bracket has a rocker arm 66 pivoted at 67 inwardly of the cooperating bracket for rocking movement. A lug 68 is welded to the outside of bracket 65 and extends forwardly therefrom as a guide for the arm 66. The upper ends of the rocker arms 66 carry the pivot rod 23 at the hitch 21. The rocker arms 66 with the rod 23 carried thereby are normally biased rearwardly by springs 69 adjacent the respective arms. Each spring is anchored at 70 at its rear end to the bracket 65 and has its forward end connected at 71 to the associated rocker arm 66. With this arrangement if the mower 41 strikes an obstruction such as pole P, the connection at the rod 23 at that side will yield as indicated in FIG. 7 to prevent damage. The same will happen when mowing at the opposite side. This also gives a breakaway when the mower 41 is backed into an object such as a pole causing the opposite side rocker arm 66 to yield so protecting both forward and reverse movement.

Figure 10:
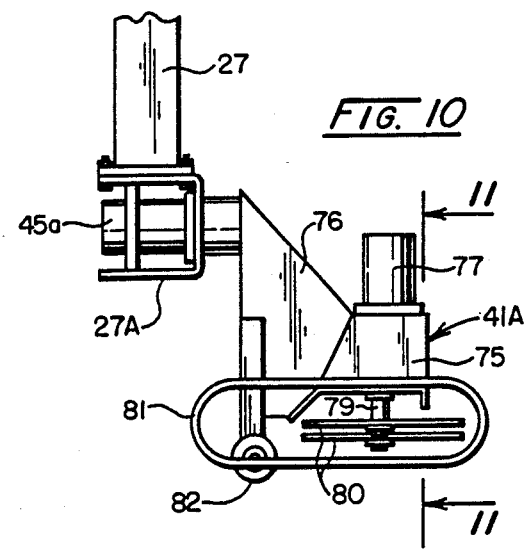
FIG. 10 is a side elevational view showing one form of mower which may be mounted on the articulated boom.
Figure 11:
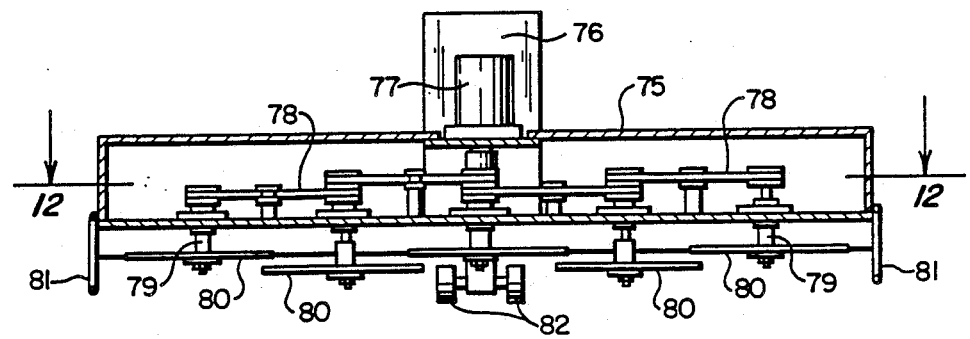
FIG. 11 is a vertical sectional view taken along line 11—11 of FIG. 10.
Figure 12:
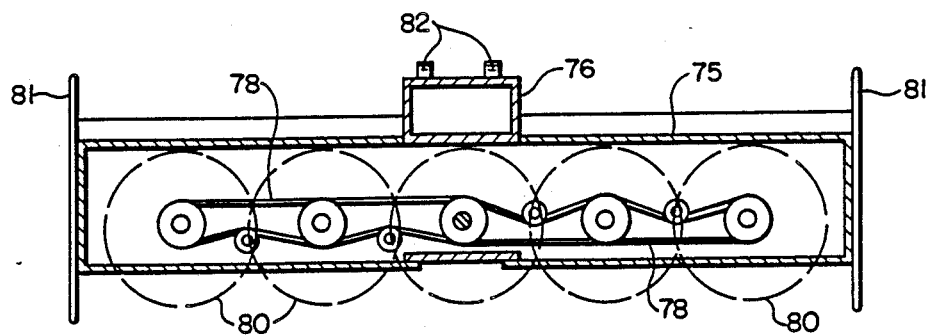
FIG. 12 is a horizontal sectional view taken along line 12—12 of FIG. 11.

FIGS. 10 to 12 show a type of mower which can be used in the attachment 22. This mower 41a is mounted on the shaft of a hydraulic motor 45a which is carried by the outer boom section 27 by means of a U-shaped bracket 27a. The mower includes housing 75 which is mounted by bracket 76 for swinging movement about the axis of the motor 45a. On the housing 75 is mounted a hydraulic drive motor 77 which is connected in the hydraulic circuit of the attachment along with motor 45a. A pulley drive 78 leads from the motor to a series of laterally spaced spindles 79 which are mounted in the housing 75 and depend therefrom where they have cutting blades keyed thereon. A feature of this mower is that adjacent blades are at different levels so that the blades 80 can overlap as indicated to fully cover the area to be cut without uncut streaks. The housing has runners 81 at each side and intermediate support rollers 82 to govern the height of cut of the mower.

Figure 2:
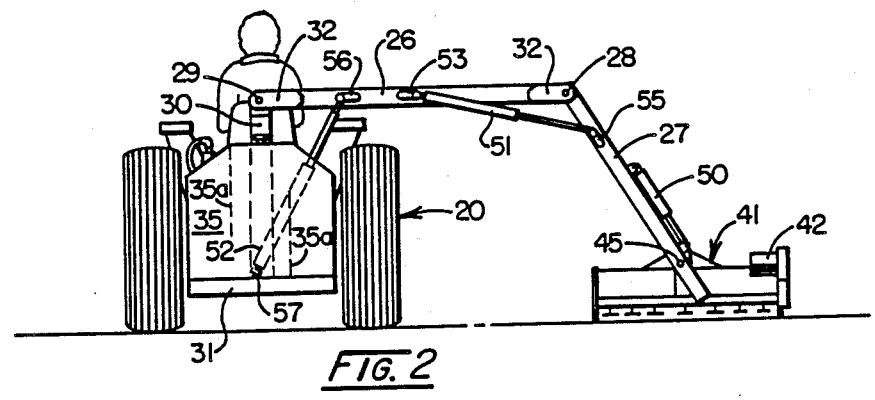
FIG. 2 is a view of the rear end of the tractor with the articulated work unit supporting boom extending at the right-hand side of the tractor to support the work unit in the form of a mower in a horizontal position.
Figure 3:
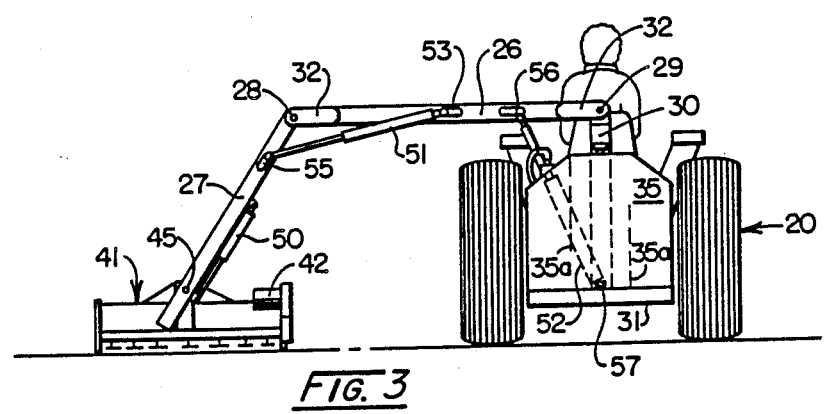
FIG. 3 is a view similar to FIG. 2 with the boom extending at the left-hand side of the tractor.
Figure 4:
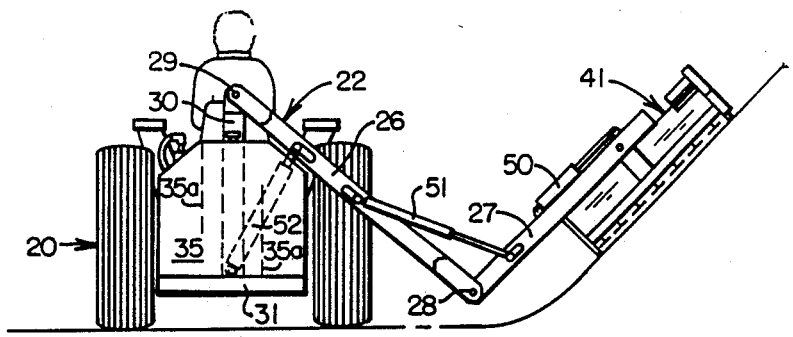
FIG. 4 is a view similar to FIG. 2 but showing the articulated boom adjusted to support the mower in an inclined position such as on a steep bank.
Figure 5:
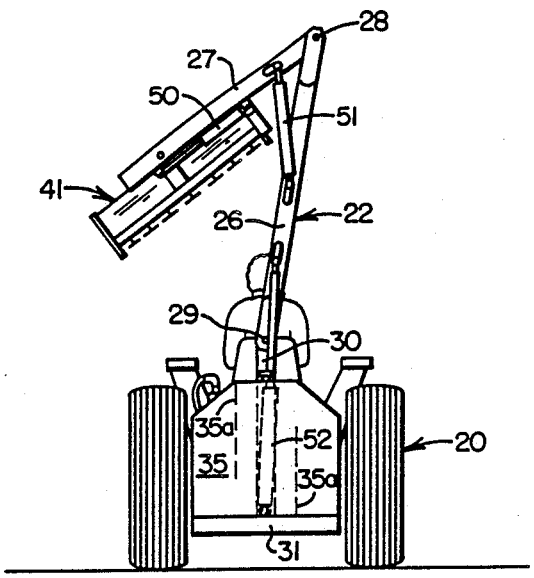
FIG. 5 shows the articulated boom being moved from the right-hand side to the left-hand side over the center of the tractor towards a position where the mower will be at the left-hand side of the tractor.

With the attachment 22 described it will usually be transported in the upright condition shown in FIG. 5. To use it to mow a horizontal area it may be swung to the right as indicated in FIG. 2. With the mower 41 horizontal at the right cutting head 41 be adjusted to this illustrated position by the rack and pinion 46, 47 operated by cylinder and piston unit 50. Or the attachment may be swung to the left as indicated in FIG. 3. If it is used to mow a steep bank at the right as indicated in FIG. 4 the mower 41 will be angled properly by the rack and pinion adjustment. A similar adjustment will be made if a steep bank to the left is to be mowed. The adjustment of the articulated boom in a transverse plane through an angle of about 320° is possible because of the arrangement of the cylinder and piston units 51 and 52 at the side of the boom rather than in the angles or knees between the pivoted boom sections 26 and 27 and support 30. This is indicated by a comparison of FIGS. 4 and 5. In swinging to the left from the position indicated in FIG. 2, the cylinder and piston unit 51 will gradually straighten the sections 26 and 27 until they are at center or in alignment. Piston unit 52 will lower sections 26 and 27 until mower 41 contacts the ground, causing sections 26 and 27 to go out of alignment. Piston unit 51 can then pull section 27 toward section 26 as indicated in FIG. 4. At the same time the cylinder and piston unit 52 will move the section 26 upright and the position of mower 41 will be reversed by the rack and pinion control to the position shown in FIG. 5. Movement of the section 27 past center will cause the mower 41 to provide a gravity pull to move piston unit 52 by center enabling it to move the articulated boom to the position shown in FIG. 3. Thus the articulated boom can position the mower at one side or the other, it being moved to a center position by the cylinder and piston units and then to a lowered position by the aid of gravity. These movements through about 210° are permitted without the units interfering with the boom and support actions since they are located to one side thereof.

Another arrangement of a similar attachment 22a at the rear of a tractor 20 is illustrated in FIGS. 13 to 15. The attachment in this instance comprises a single boom 85 which is pivoted to the upstanding support 30 at the rear of the tractor at a drive shaft 86 leading rearwardly from the power take-off of the tractor. The hitch 21 is the same as before and the breakaway pivots are provided at the ends of the rod 23. The inner end of the boom 85 is pivoted at shaft 86 to the upper end of the support 30. A cylinder and piston unit 87 is mounted and connected like unit 52 at the rear side of the boom 85 and by outwardly extending pivots controls movement of the boom 85 about the drive shaft, pivot point 86, being mounted at the side of the boom so as not to prevent swinging thereof through an angle of about 210° from one side of the tractor to the other. Cylinder and piston unit 87 is in a transverse plane parallel to that of boom 85, that is, behind it. The drive shaft 86 drives a belt 88 and pulley 89 arrangement at the front side of the boom 85 which is connected to the drive shaft 92 of a mower 41b which may be like the mower 41A previously described.

With this arrangement, the boom 85 can swing through a vertical plane transversely of the tractor without the belt 88 and pulley drive 89 on the cylinder and piston unit 87 interfering therewith. The boom can swing through an angle of about 210° so that the mower 41b can be positioned at either side of the tractor without removing and replacing parts.

To explain the swinging action of the boom 85 when it is desired to swing from the right hand side as shown in FIG. 13 to the left hand side, the hydraulic system is actuated to elongate piston unit 87. The upper end of the unit 87 is slidably connected to the boom 85 in a slot 90. As the unit 87 elongates its connection in slot 90 slides outwardly toward mower 41b and when the connection reaches the outer limit of slot 90, continued unit elongation will elevate boom 85. Rotation of the boom 85 about the shaft or pivot point 86 as unit 87 elongates will continue until the mower 41b moves its center of gravity past a vertical line extending through the axis of shaft 86. When that occurs the force of gravity will rotate the boom 85 until the unit connection in the slot 90 stops rotation when it reaches the innermost end of slot. Any further rotation of the boom toward the left is accomplished by a contraction of unit 87. In this particular embodiment the hydraulic fluid for actuating unit 87 is a part of the fluid system of the tractor whereas the embodiment of FIGS. 1–12 has its own separate hydraulic system.

It will be clear to tractor operators and those observing the drawings that in the pivoting of the boom from one side to the other, to get the gravitational assist indicated in the above paragraph, the mower 41b should be oriented to be on one side of the boom. When the boom is moving to the left, the mower should be to the left of the boom and when the boom is moving to the right, the mower should be to the right of the boom.

A hydraulic motor 45b is carried by the bracket 85a attached to the outer end of boom section 85 and the shaft thereof extends loosely through the center pulley 89 and is attached to the bracket 76a by an off-set, U-shaped unit 91 to swing it about the axis of motor 45b so as to adjust the entire mower 41b about that axis. Shaft 92 driven by pulley 89 in turn drives a gear box 93 which is mounted on the mower housing 75a driving mower blades 94. Thus hydraulic motor 45b adjusts the mower on the outer end of the boom section 85 and the belt 88 and pulley arrangement 89 drives the mower blades.

It will be apparent from the above that this invention provides a boom attachment which carries a suitable work unit at its outer end which can be mounted at the rear end of a tractor by the usual three-point hitch. The work unit is angularly adjustable on the outer end of the boom. The boom may be an articulated boom of two or more sections which are moved relatively and relative to an upstanding support by cylinder and piston units which are supported at the side of the boom and support rather than in the angles therebetween which makes it possible to swing the work unit from one side of the tractor to the other without interference. The boom may also be a single section with a mechanical drive to the work unit located so that it also will not interfere with its swinging movement on the tractor relative to its support making it also possible to move the work unit to one side or the other of the tractor.

Having thus described the invention in its preferred embodiment it will be clear that modifications may be made to the apparatus without departing from the spirit of the invention. It is not intended that the words and drawings used to describe the preferred embodiment be limited on the invention. Rather it is intended that the invention be limited only by the scope of the appended claims.

Having thus described the invention what is claimed is:

1. In combination, a tractor having parallel rear wheels, said tractor having a power take-off, said tractor being connected to a support by a hitch, a boom having inner and outer ends pivotally mounted at its inner end to said support by a first pivot, a work unit pivotally mounted by a second pivot to the outer end of said boom, and a first piston and cylinder unit pivotally connected at its inner end to said support by a third pivot and to said boom intermediate the ends of said boom,
   said boom being mounted to extend in a vertical plane transverse to the orientation of said wheels,
   said work unit including a cutting tool, said tool being partially enclosed by a housing, means for pivoting said housing about said second pivot through a vertical angle of up to about 210° relative to said boom for purposes of orienting the cutting tool, said housing being aligned to pivot in a plane offset and parallel to the plane of said boom,
   means for pivoting said boom in said vertical transverse plane about said first pivot through an angle of up to about 210°.

2. The combination of claim 1 wherein the connection between the boom and the piston and cylinder combination includes a slot in said boom and a sliding connection on the outer end of the piston and cylinder combination fitting into said slot.

3. The combination of claim 1 wherein the connection between the boom and the piston and cylinder combination includes a slot in said boom and a sliding connection on the outer end of the piston and cylinder combination fitting into said slot,
   the support being attached to said hitch by a transverse front rod about which said support may pivot forward and rearward, and a cylinder and piston unit connected to said support and to said tractor for controlling said pivoting movement about said rod.

4. The combination according to claim 1 in which the support is attached to the tractor by a transverse breakaway pivot which permits yielding in case the work unit strikes an obstruction.

5. The combination according to claim 1 in which the boom is comprised of at least two articulated sections with the innermost section pivoted to said support and the outermost section carrying said work unit, the innermost and outermost sections being mounted in the same vertical plane, and means for controlling relative movement of the articulated sections, said means comprising a second cylinder and piston unit connected to the respective sections along the sides thereof in a plane offset and parallel to the vertical plane of the boom so as not to interfere with relative movement of the articulated sections.

6. The combination according to claim 5 in which the cylinder and piston units are connected to the respective articulated sections intermediate their ends by pivots which extend laterally outwardly from the sections.

7. The combination according to claim 6 in which the support is upstanding and is carried by a base which is attached to a tractor at its rear by a hitch and to said power take-off, said boom being pivoted to said support for movement in a plane transverse to a line parallel to the rear wheels, each of said cylinder and piston units being supported in a different transverse plane behind the transverse plane of said boom.

8. The combination according to claim 7 in which the base is attached to the hitch of the tractor by breakaway joints which permit yielding of the base rearwardly when the work unit strikes an obstruction.

9. The combination according to claim 8 in which the base is attached to said hitch at a transverse front rod about which said base may pivot forward and rearward, and a cylinder and piston unit connected to said support and to said tractor for controlling said pivoting movement about said rod.

10. The combination according to claim 1 in which said means for adjusting the work unit comprises a rack and pinion carried by the boom.

11. The combination according to claim 10 in which a cylinder and piston unit is carried by the boom for actuation of the rack and pinion.

12. The combination according to claim 1 including a hydraulic motor supported by the boom for rotating said housing.

13. The combination according to claim 1 in which the work unit has rotable parts,
   a mechanical drive extends along the boom to drive said parts.

14. The combination according to claim 1 in which the work unit is a mower comprising the housing pivoted to the boom, a plurality of vertical spindles carried by the housing, cutters carried by the spindles in overlapping relationship to each other, and means for driving said spindles.

15. The combination according to claim 14 in which the cutters are in the form of horizontal discs with adjacent discs at different levels in the spindles so that they overlap.

* * * * *